US010902257B2

(12) United States Patent
Vandini et al.

(10) Patent No.: US 10,902,257 B2
(45) Date of Patent: Jan. 26, 2021

(54) METHOD FOR IDENTIFYING A TIMEPIECE

(71) Applicant: PATEK PHILIPPE SA GENEVE, Genève (CH)

(72) Inventors: Alessandro Vandini, Tannay (CH); Laurent Bernasconi, Crassier (CH)

(73) Assignee: PATEK PHILIPPE SA GENEVE, Genève (CH)

( * ) Notice: Subject to any disclaimer, the term of this patent is extended or adjusted under 35 U.S.C. 154(b) by 0 days.

(21) Appl. No.: 16/606,930

(22) PCT Filed: Apr. 24, 2018

(86) PCT No.: PCT/IB2018/052840
§ 371 (c)(1),
(2) Date: Oct. 21, 2019

(87) PCT Pub. No.: WO2018/198025
PCT Pub. Date: Nov. 1, 2018

(65) Prior Publication Data
US 2020/0134312 A1 Apr. 30, 2020

(30) Foreign Application Priority Data
Apr. 24, 2017 (EP) .................................... 17167752

(51) Int. Cl.
*G06K 9/00* (2006.01)
*G04D 99/00* (2006.01)
*G06K 9/48* (2006.01)
*G06K 9/52* (2006.01)

(52) U.S. Cl.
CPC ......... *G06K 9/00577* (2013.01); *G04D 99/00* (2013.01); *G06K 9/48* (2013.01); *G06K 9/52* (2013.01); *G06K 2009/0059* (2013.01)

(58) Field of Classification Search
CPC ........ G06K 9/00577; G06K 9/48; G06K 9/52; G06K 2009/0059; G04D 99/00; G07D 7/2033
See application file for complete search history.

(56) References Cited

U.S. PATENT DOCUMENTS

| 6,308,891 | B1 * | 10/2001 | Regev | G06K 19/06028 |
| | | | | 235/462.03 |
| 8,219,571 | B2 | 7/2012 | Ren et al. | |
| 8,374,437 | B2 | 2/2013 | Nakamura et al. | |
| 8,910,859 | B2 * | 12/2014 | Massicot | G07D 7/0043 |
| | | | | 235/375 |
| 9,053,364 | B2 * | 6/2015 | Mercolino | G06K 7/10 |
| 9,053,595 | B2 * | 6/2015 | Grove | G07D 5/005 |
| 9,070,042 | B2 | 6/2015 | Yamada et al. | |
| 9,367,710 | B2 * | 6/2016 | Callegari | G06K 5/04 |
| 10,102,407 | B2 * | 10/2018 | Sanwald | G06Q 10/083 |
| 10,235,618 | B2 * | 3/2019 | Toedtli | G06K 19/14 |
| 2003/0219145 | A1 | 11/2003 | Smith | |
| 2006/0222235 | A1 | 10/2006 | Kanegae | |
| 2007/0086626 | A1 * | 4/2007 | Mariani | G06K 9/00228 |
| | | | | 382/115 |
| 2009/0008924 | A1 | 1/2009 | Ophey | |
| 2009/0033914 | A1 | 2/2009 | Doublet | |
| 2009/0302123 | A1 | 12/2009 | Lugt et al. | |
| 2011/0150342 | A1 * | 6/2011 | Franken | G06K 19/16 |
| | | | | 382/190 |
| 2012/0330684 | A1 * | 12/2012 | Jacobs | H04N 7/18 |
| | | | | 705/3 |
| 2013/0315437 | A1 * | 11/2013 | Kerschner | G06K 9/6202 |
| | | | | 382/100 |
| 2014/0140570 | A1 | 5/2014 | Ross | |
| 2017/0277919 | A1 * | 9/2017 | Kozlov | G06K 7/10297 |
| 2017/0341184 | A1 * | 11/2017 | Melas | G01N 21/87 |
| 2018/0088537 | A1 * | 3/2018 | Murai | G04B 19/04 |
| 2018/0293591 | A1 * | 10/2018 | Spears | H04L 9/3226 |

FOREIGN PATENT DOCUMENTS

| CN | 104504360 A | 4/2015 |
| EP | 0247788 A2 | 12/1987 |
| KR | 101038706 B2 | 6/2011 |
| WO | 2006/131831 A1 | 12/2006 |
| WO | 2007/028799 A1 | 3/2007 |
| WO | 2008/034250 A1 | 3/2008 |
| WO | 2008/076652 A2 | 6/2008 |
| WO | 2008/134910 A1 | 11/2008 |
| WO | 2010/043618 A1 | 4/2010 |
| WO | 2010/147229 A1 | 12/2010 |
| WO | 2012/041063 A1 | 4/2012 |
| WO | 2012/145842 A1 | 11/2012 |
| WO | 2013/009422 A2 | 1/2013 |
| WO | 2013/113869 A1 | 8/2013 |
| WO | 2014/070958 A1 | 5/2014 |
| WO | 2015/071442 A1 | 5/2015 |
| WO | 2015/138820 A1 | 9/2015 |
| WO | WO2017/050763 | 3/2017 |

OTHER PUBLICATIONS

International Search Report, PCT/IB2018/052840, dated Jun. 27, 2018.
Feng, "Combining minutiae descriptors for fingerprint making," Pattern Recognition 41 (2008) 342-352.

* cited by examiner

*Primary Examiner* — Xuemei G Chen
(74) *Attorney, Agent, or Firm* — Nixon & Vanderhye

(57) ABSTRACT

Disclosed is a method for identifying a timepiece including a first component, e.g. the movement, and a second component, e.g. the case. A first zone of the first component of the timepiece is photographed with sufficient enlargement to show therein the tracks and flaws in or on the substrate of the first component in this first zone resulting from the process of manufacturing the timepiece and in particular the tracks or flaws produced when the second component is fitted into the first component. An identification mark (label, chemical or physical modification of the substrate) is applied to a second zone of the second component of the timepiece. These tracks or flaws are converted into a unique code by an appropriate algorithm and this code is associated with at least one item of information contained in the identification mark to form a unique and complete identifier of the item.

20 Claims, No Drawings

METHOD FOR IDENTIFYING A TIMEPIECE

The present invention relates to a method for identifying a timepiece.

The concepts of traceability and unique authentication of a product are highly important in particular in the field of horology. A number of solutions are known for facilitating the identification of a finished product, the most frequently used being the addition of a unique physical identifier, external or internal to the item (chip, bar code, RFID tag . . . ) or the application of a unique chemical or physical mark directly to the item. The information linked to this unique identifier is then stored in a database which can be accessed for comparison and authentication of a product by e.g. an after-sales service or even by the final customer.

In the field of horology the solution most commonly used for providing traceability and authentication of a piece is the physical or chemical marking (e.g. etching of a unique identification number). This marking can be produced at a visible or non-visible place on the finished product. For aesthetic reasons, the addition of a unique physical identifier (chip, bar code . . . ) on the outside of the timepiece has only limited scope.

However, the identification mark which cannot be seen on the finished assembled product means that the latter has to be disassembled at least partially in order for its authenticity to be checked, whereas the mark placed on a visible part of the item must be attractive, inobtrusive and wear-resistant in order to avoid it being rubbed off and to ensure that the item can be satisfactorily identified over time.

The object of the present invention is to provide a method for identifying an item which is particularly adapted to the field of horology and which permits increased traceability and facilitated authentication of the item.

The present invention relates to an identification method as claimed in claim 1.

The method for identifying a timepiece in accordance with the invention comprises the following steps:

The first step consists of photographing a first zone of the timepiece with sufficient enlargement to show the tracks or flaws in or on the substrate of the timepiece which result from the process of manufacturing the timepiece (polishing, etching, milling, turning, enameling, assembling . . . ) in this first zone. These tracks or flaws are distinct, distinguishable and unique from one item to another. They thus constitute a unique identification fingerprint of the timepiece. The first zone of the timepiece is preferably chosen to be visible from the outside of the timepiece and likely to undergo little or no changes during use of the timepiece.

The tracks or flaws characterising the first zone can also include e.g. the scratches which are formed on an element of the timepiece (e.g. a post or a pivot of a timepiece) when a first component of the timepiece (e.g. the movement) is fitted into a second component of the timepiece (e.g. the case). These scratches can be likened to a unique fingerprint of the element.

The first zone can be the pivot of the seconds hand or the centre post of the movement of a timepiece. These elements generally have a polished surface, especially for aesthetic reasons. The polishing tracks can be visible using photography with sufficient enlargement and are distinct, distinguishable and unique from one pivot or post to the other, from one timepiece to the other. Furthermore, the pivot of the seconds hand or the centre post is protected by the glass of the timepiece through which it nevertheless remains visible and thus does not risk being damaged or changed by use or wearing of the timepiece. In the example of the pivot of the seconds hand, the photograph is preferably taken as far downstream in the manufacturing process as possible, i.e. when the timepiece is finished and assembled, and from the outside. The photograph could also be taken at a different point in the manufacturing process, e.g. before positioning the glass.

The second step of the method consists of using an appropriate algorithm to convert the tracks or flaws in or on the first zone which are picked out by photography in the preceding step into a unique code to form a unique identifier of the timepiece.

Finally, the unique identifier is stored in a database to permit authentication of the timepiece in the future by comparing the new unique code obtained by a new photograph of the first zone.

In addition to the unique code characterising the tracks and flaws of the substrate of the timepiece in the first zone, the unique identifier preferably also comprises information characteristic of the first zone (coordinates in a reference frame specific to the timepiece, name of the zone or of the element, . . . ) permitting this first zone to be located on the timepiece.

Thus an identification method is obtained permitting rapid, easy authentication without disassembling the timepiece: indeed it is merely necessary to take a new photograph of the first zone, to convert the tracks or flaws picked out into a new code using the appropriate algorithm and to compare this new code with the unique code of the unique identifier of the timepiece stored in the database.

The method in accordance with the invention is also easy to implement without it being necessary to resort to complex means for photographing the first zone. The data stored for each item can be of minimum volume owing to the nature thereof (alphanumeric format e.g. for the unique code and the information characteristic of the first zone without the need to store an image), saving storage space and permitting more rapid access to the database.

The identification method in accordance with the invention also comprises the following steps.

A macroscopic identification mark is applied to a second zone of the timepiece. This second zone is preferably not visible from the outside without disassembling the timepiece. This mark can be e.g. a label or obtained by a physical or chemical modification of the substrate of the timepiece in said second zone, such as by etching. The mark contains at least one item of information on the timepiece (serial number, model . . . ). In the case of a timepiece such as a watch, this mark can be the serial or model number traditionally etched inside the watch case.

The item(s) of information contained in the identification mark is/are associated with the unique identifier of the timepiece (unique code and possibly information characteristic of the first zone) and stored therewith in the database, to permit authentication of the timepiece in the future by comparing the identification mark or the new code obtained by a new photograph of the first zone.

This method thus offers, if necessary, a yet more robust and complete authentication of the timepiece.

Furthermore, this method is particularly suitable for the field of horology. Indeed, a timepiece is very often composed of at least two distinct components which are brought or fitted together during final assembly, such as e.g. the case and the movement. In this case it is possible to choose the first zone of the timepiece on the first component, e.g. the movement, and to apply the identification mark (e.g. an etched serial number) to the second component, e.g. the case. Thus, even if the identification mark is hidden in the watch case during assembly of the timepiece, said piece is still easily identifiable by its first zone if this is visible from the outside, while the timepiece can be completely authenticated by disassembly.

The method in accordance with the invention makes it possible to ensure that, even in the event of repair or maintenance necessitating disassembly, the timepiece is then traceable as a whole via each of its components. Furthermore, the tracking and identification of the timepiece are still possible even if the first zone comes to be damaged (repair, wear . . . ). In this case, it is possible to define a new first zone characterised by new characteristic information in order to obtain a new unique code to associate with the information contained in the identification mark applied to the second zone to obtain a new unique and complete identifier of the timepiece.

The invention claimed is:

1. Method for identifying a timepiece comprising a first component and a second component, said method comprising the following steps:
   photographing a first zone chosen on the first component of the timepiece with sufficient enlargement to show the tracks or flaws in or on the substrate of the timepiece in this first zone resulting from the process of manufacturing the timepiece, said tracks or flaws in or on the first zone comprising scratches produced when the second component is fitted into the first component;
   using an appropriate algorithm to convert the tracks or flaws of the first zone which are picked out by photography into a unique code to form a unique identifier of the timepiece;
   storing the unique identifier of the timepiece in a database to permit authentication of the timepiece in the future by comparison with a new unique code obtained after conversion by the algorithm of the tracks or flaws picked out by a new photograph of said first zone;
   applying an identification mark to a second zone chosen on the second component of the timepiece, said mark containing at least one item of information characterising the timepiece;
   associating said at least one item of information contained in the identification mark with the unique identifier of the timepiece and storing it with said unique identifier in the database to permit authentication of the timepiece in the future by comparison of the identification mark and/or a new unique code obtained after conversion by the algorithm of the tracks or flaws picked out by a new photograph of said first zone.

2. Method for identifying a timepiece as claimed in claim 1, wherein the unique identifier further comprises information characteristic of the first zone permitting its location on the timepiece.

3. Method for identifying a timepiece as claimed in claim 1, wherein the first zone is chosen on a visible part of the outside of the timepiece.

4. Method as claimed in claim 1, wherein the identification mark is obtained by chemical or physical modification of the substrate of the second component of the timepiece in the second zone.

5. Method as claimed in claim 1, wherein the identification mark is not visible from the outside of the timepiece without disassembling the timepiece.

6. Method as claimed in claim 1, wherein the first component is formed by the movement of the timepiece and the second component is formed by the case of the timepiece which is intended to receive said movement.

7. Method as claimed in claim 6, wherein the first zone is the pivot of the seconds hand or the centre post of the movement of the timepiece.

8. Method for identifying a timepiece as claimed in claim 2, wherein the first zone is chosen on a visible part of the outside of the timepiece.

9. Method as claimed in claim 2, wherein the identification mark is obtained by chemical or physical modification of the substrate of the second component of the timepiece in the second zone.

10. Method as claimed in claim 3, wherein the identification mark is obtained by chemical or physical modification of the substrate of the second component of the timepiece in the second zone.

11. Method as claimed in claim 2, wherein the identification mark is not visible from the outside of the timepiece without disassembling the timepiece.

12. Method as claimed in claim 3, wherein the identification mark is not visible from the outside of the timepiece without disassembling the timepiece.

13. Method as claimed in claim 4, wherein the identification mark is not visible from the outside of the timepiece without disassembling the timepiece.

14. Method as claimed in claim 2, wherein the first component is formed by the movement of the timepiece and the second component is formed by the case of the timepiece which is intended to receive said movement.

15. Method as claimed in claim 3, wherein the first component is formed by the movement of the timepiece and the second component is formed by the case of the timepiece which is intended to receive said movement.

16. Method as claimed in claim 4, wherein the first component is formed by the movement of the timepiece and the second component is formed by the case of the timepiece which is intended to receive said movement.

17. Method as claimed in claim 5, wherein the first component is formed by the movement of the timepiece and the second component is formed by the case of the timepiece which is intended to receive said movement.

18. Method as claimed in claim 8, wherein the identification mark is obtained by chemical or physical modification of the substrate of the second component of the timepiece in the second zone.

19. Method as claimed in claim 8, wherein the identification mark is not visible from the outside of the timepiece without disassembling the timepiece.

20. Method as claimed in claim 9, wherein the identification mark is not visible from the outside of the timepiece without disassembling the timepiece.

* * * * *